US012289804B2

(12) United States Patent
Bürkle et al.

(10) Patent No.: US 12,289,804 B2
(45) Date of Patent: Apr. 29, 2025

(54) ELECTRIC HEATING DEVICE

(71) Applicant: Eberspächer catem GmbH & Co. KG, Herxheim (DE)

(72) Inventors: Kai-Fabian Bürkle, Hinterweidenthal (DE); Stefan Plewnia, Karlsruhe (DE)

(73) Assignee: Eberspächer Catem GmbH & Co. KG, Herxheim (DE)

( * ) Notice: Subject to any disclaimer, the term of this patent is extended or adjusted under 35 U.S.C. 154(b) by 377 days.

(21) Appl. No.: 17/153,055

(22) Filed: Jan. 20, 2021

(65) Prior Publication Data

US 2021/0227633 A1 Jul. 22, 2021

(30) Foreign Application Priority Data

Jan. 21, 2020 (DE) ..................... 10 2020 200 639.3

(51) Int. Cl.

*H05B 1/02* (2006.01)
*F28F 3/06* (2006.01)
*F28F 9/22* (2006.01)
*H05B 3/28* (2006.01)

(52) U.S. Cl.

CPC ............. *H05B 1/0236* (2013.01); *F28F 3/06* (2013.01); *H05B 3/283* (2013.01);
(Continued)

(58) Field of Classification Search

CPC ........... F28F 2009/222; F28F 2009/224; F28F 2009/226; F28F 2230/00; F28F 2250/102; F28F 3/02; F28F 3/06; F28F 9/22; H05B 1/00; H05B 1/02; H05B 1/0227; H05B 1/023; H05B 1/0236; H05B 1/0244; H05B 2203/016; H05B 2203/02;
(Continued)

(56) References Cited

U.S. PATENT DOCUMENTS 4,508,957 A * 4/1985 Rocchitelli ............. B60S 1/488 392/479
5,560,851 A * 10/1996 Thimm .................. H05B 3/283 219/544
2004/0200829 A1* 10/2004 Hamburger .............. H05B 3/06 219/548
2006/0138712 A1* 6/2006 Hamburger .............. H05B 3/06 264/1.21

(Continued)

FOREIGN PATENT DOCUMENTS

AT 30 882 3/1988
CN 102203517 A 9/2011

(Continued)

*Primary Examiner* — John J Norton
*Assistant Examiner* — Theodore J Evangelista
(74) *Attorney, Agent, or Firm* — Boyle Fredrickson, S.C.

(57) ABSTRACT

An electric heating device for a motor vehicle has a first housing part which surrounds a first circulation chamber and a second housing part which surrounds a second circulation chamber. The first and second circulation chambers abut against each other. A PTC heating device is interposed between the first and second housing parts. The PTC heating device comprises a first cover element covering the first circulation chamber of the first housing part and a second cover element covering the second circulation chamber of the second housing part. At least one PTC element is provided between the first and the second cover elements. An electrode field is provided on the interior side of each of the respective cover elements and is electrically conductively contacted on the PTC element.

20 Claims, 2 Drawing Sheets

(52) U.S. Cl.
CPC ..... *F28F 2009/226* (2013.01); *F28F 2230/00* (2013.01); *F28F 2250/102* (2013.01); *H05B 2203/016* (2013.01); *H05B 2203/02* (2013.01); *H05B 2203/021* (2013.01)

(58) Field of Classification Search
CPC ........ H05B 2203/021; H05B 2203/022; H05B 2203/023; H05B 3/00; H05B 3/0009; H05B 3/20; H05B 3/22; H05B 3/28; H05B 3/283
See application file for complete search history.

(56) References Cited

U.S. PATENT DOCUMENTS

| | | | | |
|---|---|---|---|---|
| 2011/0188839 | A1* | 8/2011 | Trebouet | F24H 1/009 392/478 |
| 2018/0065447 | A1* | 3/2018 | Cmelik | F24H 9/1827 |
| 2020/0137837 | A1* | 4/2020 | Daniel | H05B 1/0297 |

FOREIGN PATENT DOCUMENTS

| | | | | |
|---|---|---|---|---|
| CN | 103423871 | A1 | 12/2013 | |
| DE | 10 2011 000 116 | | 7/2012 | |
| DE | 102011000116 | A1 * | 7/2012 | B60H 1/2221 |
| DE | 2014006425 | U1 | 8/2014 | |
| EP | 2440004 | | 4/2012 | |
| EP | 2797382 | | 10/2014 | |
| EP | 3726926 | A1 * | 10/2020 | F24D 13/02 |
| FR | 2 943 296 | | 9/2010 | |
| FR | 2943296 | A1 * | 9/2010 | B60S 1/488 |

* cited by examiner

ELECTRIC HEATING DEVICE

BACKGROUND OF THE INVENTION

1. Field of the Invention

The present invention relates to an electric heating device. In particular, the present invention relates to an electric heating device for a motor vehicle having a first housing part which surrounds a first circulation chamber and a second housing part which surrounds a second circulation chamber, wherein the two circulation chambers abut against each other.

2. Background of the Invention

Such an electric heating device is known from EP 2 440 004 A1. A similar electric heating device is known from EP 2 797 382 Bl.

In the heating device known from EP 2 440 004 A1, the respective circulation chambers are formed by a metallic housing into which circumferentially closed heating fins project, each of which forms receiving pockets. In the corresponding receiving pockets, PTC heating devices are provided, which exhibit a PTC element energized with different polarity, which generates heat within the pocket by energization, which is conducted by heat conduction through the pocket and into the circulation chamber, where it is dissipated. The heat is accordingly dissipated on the outside of the pocket by the fluid to be heated.

In the prior art according to EP 2 440 004 A1, there is a sealing plate between the housing parts arranged against each other, which seals the two housing parts against each other, however, it is provided with a hole so that the respective circulation chambers can communicate through the hole. Inlet and outlet connecting pieces for the fluid to be heated are provided on one of the end faces.

Electric heating devices, especially for a motor vehicle, must be configured to withstand vibrations. In addition, they must be constructed compactly. The electric heating device must be lightweight. It must operate without interference. Due to the self-regulating properties of the PTC elements, it is also necessary for them to be electrically well contacted so that the power current can be introduced into the PTC element with a high degree of reliability, while at the same time ensuring good dissipation of the heat generated by the PTC element into the circulation chamber.

SUMMARY

The present invention aims to provide an electric heating device of the type mentioned introductorily, which complies with the above requirements in an improved manner. In particular, the present invention aims to provide a simply constructed electric heating device. The electric heating device is intended to be suitable for heating liquid media, in particular for heating a water circuit within the vehicle.

In view of this, the present invention provides an electric heating device having a first housing part which surrounds a first circulation chamber, and a second housing part which surrounds a second circulation chamber. A PTC heating device is provided between the two housing parts. The housing parts abut under interposition of the PTC heating device. Thus, the heat generating cell of the electric heating device is located between the two housing parts. These are usually configured in the form of boxes, with the open upper side of the respective boxes being in sealed contact with the PTC heating device. Thus, the PTC heating device covers the first circulation chamber of the first housing part and the second circulation chamber of the second housing part. For this purpose, the PTC heating device has a first and a second cover element, respectively. At least one PTC element is provided between these two cover elements. The PTC element is energized between the two cover elements. While the circulation chamber is closed directly by the outer upper surface of the cover element, which is wetted or coated with the fluid to be heated, the PTC element is located on the opposite inner surface of the respective cover element. An electrode field is provided on the inside of the first and second cover element, respectively, and is electrically conductively contacted with the PTC element.

The two cover elements lie as parallel layers between the two housing parts. The two housing parts usually abut directly against the cover elements. A direct abutment in this sense is also an abutment with the interposition of a seal. Such an abutment is beneficial since, on the one hand, the respective circulation chamber thereby is abutted fluid-tightly against the associated cover element. In addition, a sealing element can also be used as a reservoir for a compression force, for example to apply a fin element, which is accommodated in the circulation chamber and is in electrically conductive contact with the PTC element, under preload against the cover element, typically between two adjacent PTC elements. The respective PTC elements are located above a flow channel which is bounded laterally by the fin element, bounded on the underside by a base and bounded on the top by the cover element with the PTC element. One, typically several, PTC element(s) is/are provided between the two cover elements extending in parallel. The electrode fields to the respective PTC elements are usually adapted to the size of the PTC elements. Individual electrode fields can be connected in series. For this purpose, the respective cover element exhibits a strip conductor that usually connects directly adjacent electrode fields on a single cover element. Usually, the one cover element is assigned to a first polarity and the other cover element to a second polarity for energizing the PTC element. Thus, the PTC element can be energized via the respective cover element. The cover element can be made of or formed from an insulating material, for example a ceramic plate, in particular an aluminum oxide plate. A metallization is usually applied to the inside of such a plate, which forms the electrode field. The metallization can be formed by sputtering, printing or vapor deposition. Alternatively, the cover element can be formed by a metal sheet provided with a non-conductive layer recessed in the area of the electrode field. Thus, the metal sheet forms the bus bar for energizing the PTC element or elements. The metal sheet may be provided with an electrically non-conductive layer outside the electrode field to improve clearance and creepage distances between the cover elements of different polarity. The metal sheet is usually completely surrounded by the electrically non-conductive layer inside the housing parts apart from the electrode fields.

In the case of a cover element formed from a metal sheet, the surface of the cover element covering the circulation chamber is usually configured to be electrically nonconductive. Thus, a metal sheet can be covered with an electrically non-conductive foil or coated with an electrically non-conductive, for example ceramic, layer. The cover element may be configured such that the fluid to be heated and located in the circulation chamber does not directly wet the electrically conductive elements of the cover element.

According to a preferred further development of the present invention, the respective housing parts are each formed by a plastic trough, which exhibit at least one connecting piece leading to the circulation chamber and projecting from the plastic trough. The housing parts may be formed identically. Thus, identical components can be used to form the two housing parts of the present invention, which reduces production costs.

It is further preferred that each of the housing parts has only one single connecting piece and that the two circulation chambers are fluidically interconnected via a bore penetrating the PTC heating device. In this way, the advantages known in this respect from EP 2 440 004 A1 can be used, i.e. a compact electric heating device can be created that requires only a few components. It is understood that the bore penetrating the PTC device is sealed with respect to the interior of the PTC device so that the medium to be heated cannot reach the PTC elements and the electrode fields. The bore can, for example, be surrounded between the first and the second cover element by an insulating mass or a sealing element which is clamped, glued or arranged between the two cover elements.

According to a further preferred configuration, in which a fin element is provided between a base of the first or second housing part and the PTC heating device, which is connected in a thermally conductive manner to at least one of the PTC elements, improved heat dissipation to the medium to be heated results within a trough-shaped housing part. Such a measure is particularly advantageous in the case where the housing part is formed as a trough made of plastic.

The fin element is made of a material with good thermal conductivity. It can be made of ceramic or metal. The fin element can be formed as a simple metallic disk. The fin element can also be formed with openings or as a relatively complex radiator element, which can be formed from bent metal sheet or extruded profiles, in particular from aluminum. The fin element is usually supported on the base of the associated housing part and the cover element covering this housing part as a separate component. Fastening can be done by adhesive bonding or positive locking.

The fin element may be applied under pretension against the point of the cover element that lies between two PTC elements. This reliably enables good heat dissipation of the heat generated by the PTC element. The fin element can be applied against the cover element under elastic pretension and connected to the PTC elements in a thermally conductive manner. The fin element can also be connected to a side wall circumferentially closing the trough, possibly such that the flow path is laid between the fin element and the adjacent side wall. Thus, the fin element may project from the base and the cover element and the adjacent side wall such that the flow can only pass the end side of the fin element opposite the side wall.

Several fin elements may be provided one behind the other and offset from one another in the extension direction of the respective circulation chamber, and are thereby attached laterally to the side wall of the respective housing, and possibly such that a meandering flow channel is formed by the fin elements. The fluid flowing through the circulation chamber in the extension direction is accordingly deflected via the respective fin elements and guided through the circulation chamber in a meandering manner, as a result of which the surface of the fin elements covered by the fluid to be heated is increased. The extension direction of the housing may be a longitudinal or width direction of the housing. The height direction distances the base from the cover element. Usually, on one end face of the housing part there is the aforementioned connecting piece and adjacent to the end face opposite thereto there is provided the bore penetrating the PTC heating device, which transfers the flow from one housing part to the other housing part.

As a further measure to improve the clearance and creepage distance between the electrode fields of different polarity, it is proposed in accordance with a preferred further development that an edge of the electrode field projecting beyond the PTC element is covered by a bead of an insulating material which projects beyond the electrode field such that the PTC element is held positively between opposing beads. Such beads are usually associated with both electrode fields to form one PTC element each. The beads also provide positive retention of the PTC element on the electrode metal sheet. The respective PTC element can only be moved up to the bead. Thus, the PTC element can be merely clamped between the electrode fields and not otherwise directly connected to the cover element. The bead may be formed of an insulating adhesive material. Thus, the bead can also be used to seal in the PTC element with its circumferential edge completely or partially. The circumferential edge extends at right angles to the cover element and between the electrode fields of different polarity. Insofar as the electrode field has a smaller base area than the PTC element, the corresponding bead is bonded directly to the cover element and the edge of the PTC element.

The bead can, for example, consist of a silicone adhesive that is bonded to the inner surface of the cover element and/or the electrode field and/or the edge of the PTC element or completely seals the PTC element.

As mentioned before, a compressible seal may be provided between the two housing parts. This compressible seal stores a certain amount of compression, which in particular applies the fin elements under preload against that part of the cover element which is opposite the PTC element. The housing parts usually have an opening lying in a single plane. The planes of the two openings of the first and second housing parts may run parallel to each other. Each of the openings may be provided with a compressible seal against which the associated cover element abuts. A further compressible sealing element may be provided between the opposing cover elements. Usually, the interior between the two cover elements is sealed to the outside by a compressible mass applied close to the edge of the cover elements and connecting both cover elements.

The cover elements may each have at least one strip conductor leading to the respective electrode field. One end of the strip conductor may be exposed with an associated section of the cover element on the outside of the associated housing part to form a contact. This is where the power current is usually introduced. The section is usually located outside the aforementioned compressible seal.

BRIEF DESCRIPTION OF THE DRAWINGS

Further details and advantages of the present invention result from the following description of an embodiment in connection with the drawing. Therein.

DETAILED DESCRIPTION

Figure 1:
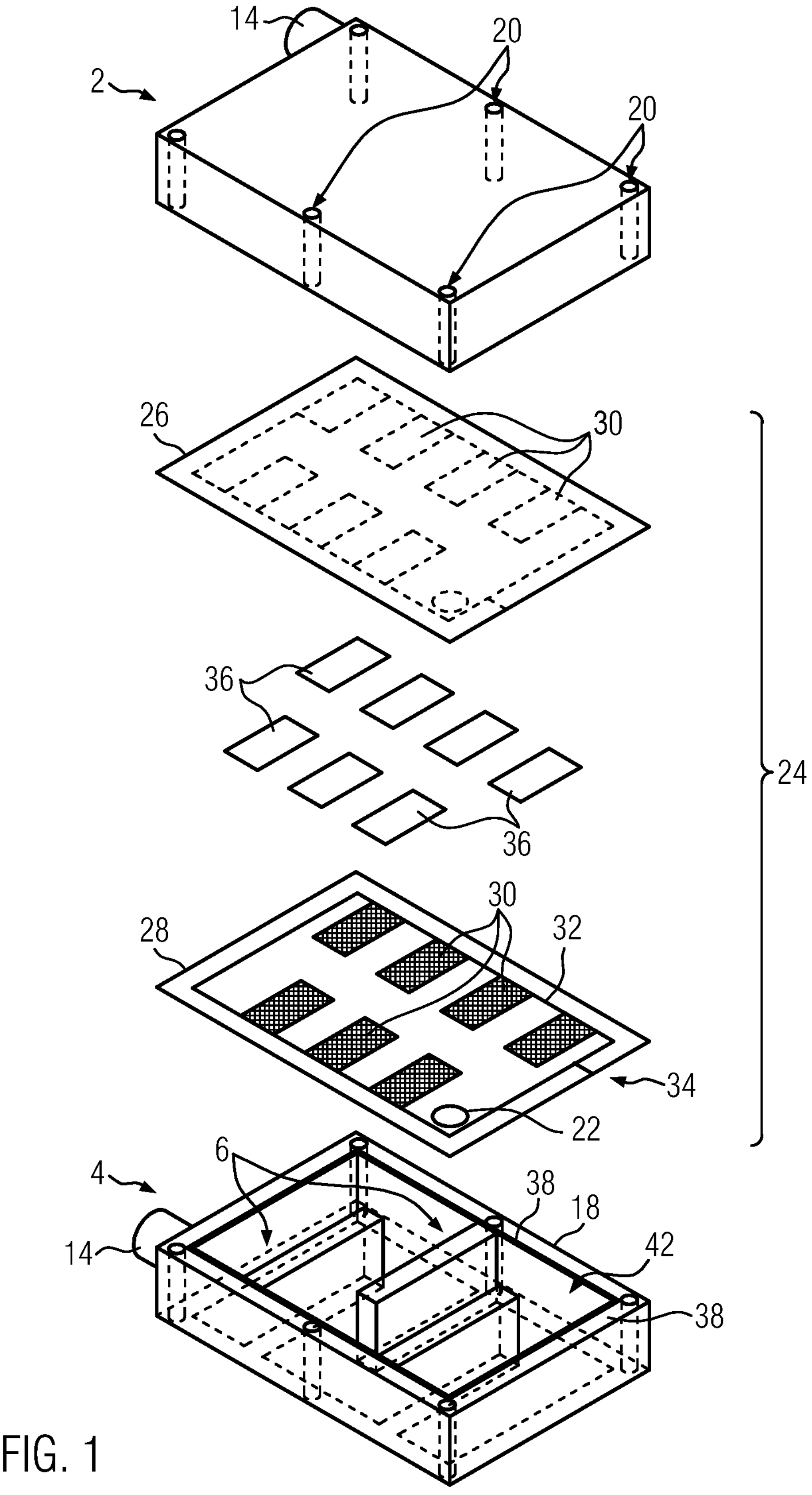
FIG. 1 shows an exploded view of the embodiment in a side view.
Figure 2:
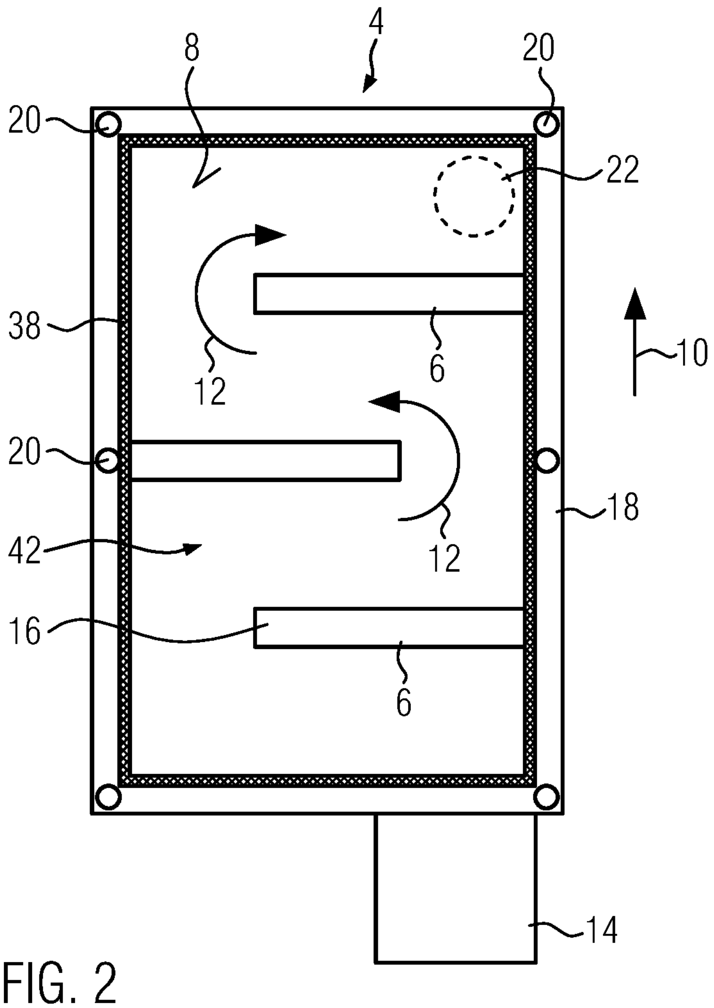
FIG. 2 shows a top view of a housing part of the embodiment.

FIG. 1 shows two identically designed housing parts 2, 4, the housing part of which identified by reference sign 2 is referred to as the first housing part 2 and the further housing part shown below it as the second housing part 4. The respective housing parts 2, 4 are configured as troughs and have openings opposite each other. The illustration according to FIG. 1 allows a view into the second housing part 4. Several fin elements 6 are arranged inside the trough-shaped housing parts 2, 4. The meandering arrangement of the fin elements 6 can be seen in particular in FIG. 2. The fin elements 6 are supported on a base 8 of the housing parts 2, 4 and are connected to the latter in such a way that no passage of fluid to be heated is possible between the respective fin element 6 and the base 8. The fin elements 6 are provided offset from one another in the main extension direction identified by reference sign 10, which corresponds to the longitudinal direction. The free ends of the fin elements 6 overlap each other considerably in the width direction, i.e. transversely to the extension direction 10 according to FIG. 2. A meandering flow channel 12 is thus formed. The fluid entering the respective housing part 2, 4 through a connecting piece identified by reference sign 14 flows against the first fin element 6 in the flow direction and is deflected. It must pass through an end side 16 of the fin element in order to get between the first and the second fin element 6. Opposite side walls 18 of the housing part 4 are provided with pass-through bores 20. At the end of the meandering flow channel 12 and opposite the connecting piece 14, a hole is indicated by reference sign 22, which is recessed in a PTC heating device 24. There, the fluid flow is transferred from the second housing part 4 into the first housing part 2.

The PTC heating device 24 and its components can be seen in particular in FIG. 1. The PTC heating device 24 has a first cover element 26 and a second cover element 28. The outer surface of the first cover element 26 covering the first housing part 2 is provided with an insulating layer or is configured in an insulating manner. Thus, for example, the first and second cover elements 26, 28 may be formed of a ceramic plate. A plurality of electrode fields 30 are arranged on the opposing inner surfaces of the respective cover elements 26, 28. In the present case, these are made by applying an electrically conductive material to the ceramic material. The different electrode fields 30 of a single cover element 26, 28 are connected in series via a strip conductor 32. The strip conductor 32 ends at a section 34 of the associated cover element. There, the strip conductor 32 is exposed at the edge. The corresponding section 34 will regularly project beyond the housing parts 2, 4 so that the electrical contacting of the strip conductor 32 can take place at the section.

PTC elements 36 are provided for each of the electrode fields 30 which can be contacted via the electrode fields 30 and to which power current can be applied. It is understood that the inner side of the first cover 26, which cannot be seen in FIG. 1, is formed in a corresponding manner. The two cover elements 26, 28 are laid against each other with the interposition of the PTC elements 36. A compressible seal identified by reference sign 38 is placed on the edge of the respective housing part 2, 4. The two housing parts 2, 4 are applied against each other with the interposition of the PTC heating element 24. Clamping pins are passed through the pass-through bores 20, which pretension the two housing parts 1, 2 against each other. This pretension pressure acts not only on the edges of the outer walls of the housing parts 2, 4 but also against the free ends of the respective fin elements 6. The fin elements 6 each abut against the cover elements 26, 28 at a point between the PTC elements 36. Thus, a certain pretension with which the fin elements 6 are pretensioned between the base 8 and the associated cover element 26, 28 is also transmitted to the PTC elements 36 via a pretension of the cover elements 26, 28, which are formed from metal sheet. Thus, the PTC elements 36 are applied under pretension against the electrode fields 30 which improves the introduction of power current into and the dissipation of heat from the respective PTC element 36. This results in good heat dissipation from the PTC heating device 24 into the respective circulation chambers, which are identified by reference sign 42 in FIGS. 1 and 2. The circulation chambers 42 are kept fluid-tight by the seals 38.

Figure 3:
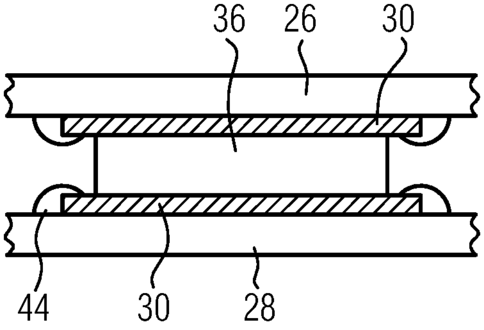
FIG. 3 shows a sectional view through the PTC heating device of the embodiment.

FIG. 3 shows a sectional view of the PTC heating element 24. It is evident that the PTC element 36 is clamped between the two cover elements 26, 28 and contacts the associated electrode field 30, the free edges of which are each covered with a bead 44 which projects beyond the electrode field 30 and also covers a certain height of the PTC element 36. This bead 44 positively secures the PTC element 36 on the electrode field 30.

The embodiment is easy to manufacture. The two housing parts 2, 4 are identically configured. A good heat dissipation results, not least because the circulation chambers 42 are each equipped with a plurality of fin elements 6, which dissipate the heat of the PTC element 36 from the PTC heating device 24 and transfer it to the respective circulation chamber 42. The meandering flow path creates the best possible dissipation of heat from the respective fin elements 6 into the fluid to be heated. The fluid is usually a liquid fluid, especially water, which usually circulates in the heating circuit of a motor vehicle. Preferred applications of the heating device according to the invention are in particular electric vehicles. The electric heating device described above can be used in particular for heating the vehicle interior. However, other electrical or electronic components inside an electric vehicle can also be heated with the electric heating device.

The invention claimed is:

1. An electric heating device for a motor vehicle, comprising:

a first housing part which surrounds a first circulation chamber;

a second housing part which surrounds a second circulation chamber, wherein the first and second circulation chambers abut against each other, and wherein the first and second housing parts abut against each other;

a PTC heating device interposed between the first and second housing parts, wherein the PTC heating device comprises a first cover element covering the first circulation chamber of the first housing part and a second cover element covering the second circulation chamber of the second housing part, a plurality of PTC elements which are provided between the first and the second cover elements, and a plurality of electrode fields which are provided entirely on interior sides of the respective cover elements in a plurality of rows, wherein each of the electrode fields is electrically conductively contacted with a specific one of the plurality of PTC elements;

wherein each of the two cover elements has a strip conductor that is configured to connect the electrode fields of the associated cover element in series.

2. The electric heating device according to claim 1, wherein the housing parts are each formed by a plastic trough comprising at least one connecting piece leading to at least one of the circulation chambers and projecting from the plastic trough.

3. The electric heating device according to claim 2, wherein each of the housing parts has only one connecting piece, and wherein the two circulation chambers are fluidically connected to each other via a hole penetrating the PTC heating device.

4. The electric heating device according to claim 1, wherein a fin element is provided between a base of the first or second housing part and the PTC heating device, which fin element is connected in a heat-conducting manner to at least one of the PTC elements of the cover element via the associated cover element.

5. The electric heating device according to claim 4, wherein a compressible seal is provided, in each case, between one of the housing parts and the associated cover element, and wherein the two housing parts are applied under pretension against one another with the compressible seal interposed such that the fin element is clamped between the electrode field and the base of the respective housing part.

6. The electric heating device according to claim 1, wherein a plurality of fin elements are provided one behind the other and offset from one another in an extension direction of the respective circulation chambers, wherein the fin elements are connected in a heat-conducting manner to at least one of the PTC elements of the cover element via the associated cover element, and wherein the fin elements are attached laterally to a side wall of the respective housing parts and are dimensioned such that a meandering flow channel is formed by the fin elements.

7. The electric heating device according to claim 1, wherein each cover element is formed by an aluminum oxide plate, and wherein each electrode field is formed by a metallization applied to the aluminum oxide plate.

8. The electric heating device according to claim 1, wherein each cover element is formed by a metal sheet provided with an electrically non-conductive layer recessed in a region of the electrode field.

9. The electric heating device according to claim 1, wherein at least one edge of each electrode field projects beyond the PTC element and is covered by a bead of an insulating material which projects beyond the electrode field such that the PTC element is provided between opposing beads in a form-fitting manner between the two cover elements.

10. The electric heating device according to claim 1, wherein the two housing parts abut tightly against each other with the interposition of at least one compressible seal.

11. The electric heating device according to claim 1, wherein one end of each strip conductor is exposed with an associated section of the associated cover element on the outside of the associated housing part for forming a contact.

12. The electric heating device according to claim 1, wherein the strip conductor is disposed along the periphery of the respective cover element at a location spaced inward from an edge of the respective cover element.

13. An electric heating device for a motor vehicle, comprising:

a first housing part which surrounds a first circulation chamber;

a second housing part which surrounds a second circulation chamber, wherein the first and second circulation chambers abut against each other, and wherein the first and second housing parts abut against each other;

a PTC heating device interposed between the first and second housing parts, wherein the PTC heating device comprises a first cover element covering the first circulation chamber of the first housing part and a second cover element covering the second circulation chamber of the second housing part, a plurality of PTC elements which are provided between the first and the second cover elements, and a plurality of electrode fields which are provided entirely on interior sides of the respective cover elements in a plurality of rows, wherein each of the electrode fields is electrically conductively contacted with a specific one of the plurality of PTC elements;

wherein each of the two cover elements has a strip conductor that is configured to connect the electrode fields of the associated cover element in series; and wherein the strip conductor of each cover element has a single end exposed with an associated section of the associated cover element on the outside of the associated housing part for forming a single contact for the respective strip conductor.

14. The electric heating device according to claim 13, wherein the housing parts are each formed by a plastic trough comprising at least one connecting piece leading to at least one of the circulation chambers and projecting from the plastic trough.

15. The electric heating device according to claim 14, wherein each of the housing parts has only one connecting piece, and wherein the two circulation chambers are fluidically connected to each other via a hole penetrating the PTC heating device.

16. The electric heating device according to claim 13, wherein a fin element is provided between a base of the first or second housing part and the PTC heating device, which fin element is connected in a heat-conducting manner to at least one of the PTC elements of the cover element via the associated cover element.

17. The electric heating device according to claim 16, wherein a compressible seal is provided, in each case, between one of the housing parts and the associated cover element, and wherein the two housing parts are applied under pretension against one another with the compressible seal interposed such that the fin element is clamped between the electrode field and the base of the respective housing part.

18. The electric heating device according to claim 13, wherein a plurality of fin elements are provided one behind the other and offset from one another in an extension direction of the respective circulation chambers, wherein the fin elements are connected in a heat-conducting manner to at least one of the PTC elements of the cover element via the associated cover element, and wherein the fin elements are attached laterally to a side wall of the respective housing parts and are dimensioned such that a meandering flow channel is formed by the fin elements.

19. The electric heating device according to claim 13, wherein each cover element is formed by one of 1) an aluminum oxide plate, and wherein each electrode field is formed by a metallization applied to the aluminum oxide plate and 2) a metal sheet provided with an electrically non-conductive layer recessed in a region of the electrode field.

20. The electric heating device according to claim 13, wherein the two housing parts abut tightly against each other with the interposition of at least one compressible seal.

* * * * *